(12) United States Patent
Zameroski

(10) Patent No.: US 10,829,234 B2
(45) Date of Patent: Nov. 10, 2020

(54) ISOLATOR DEVICES, SYSTEMS AND METHODS FOR AIRCRAFT

(71) Applicant: LORD Corporation, Cary, NC (US)

(72) Inventor: Daniel Zameroski, McKean, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 16/098,345

(22) PCT Filed: May 12, 2017

(86) PCT No.: PCT/US2017/032353
§ 371 (c)(1),
(2) Date: Nov. 1, 2018

(87) PCT Pub. No.: WO2017/197232
PCT Pub. Date: Nov. 16, 2017

(65) Prior Publication Data
US 2019/0144124 A1    May 16, 2019

Related U.S. Application Data

(60) Provisional application No. 62/336,003, filed on May 13, 2016.

(51) Int. Cl.
*F16F 15/00*     (2006.01)
*B64D 27/26*    (2006.01)
(Continued)

(52) U.S. Cl.
CPC ............ *B64D 27/26* (2013.01); *B64C 27/001* (2013.01); *F16F 15/02* (2013.01);
(Continued)

(58) Field of Classification Search
CPC ........... B64D 27/26; B64C 27/001; F16F 7/00
(Continued)

(56) References Cited

U.S. PATENT DOCUMENTS 3,168,270 A    2/1965 Bligard et al.
4,214,738 A    7/1980 Casper
(Continued)

FOREIGN PATENT DOCUMENTS

| WO | 99/64764 | 12/1999 |
| WO | 2010/085360 | 7/2010 |
| WO | 2015/07043 | 5/2015 |

OTHER PUBLICATIONS

H. A. King, "Center-Bolted Mounts," retrieved on May 23, 2016 from http://ha-king.com/center-bolted-mounts/.
(Continued)

*Primary Examiner* — Steven M Marsh
(74) *Attorney, Agent, or Firm* — Jenkins, Wilson, Taylor & Hunt, P.A.

(57) ABSTRACT

Aircraft isolator devices, systems, and methods for isolating a structural component within an aircraft can include an engine interface, airframe, and one or more (e.g., a plurality of) isolator devices attached to the engine interface and the airframe. In some aspects, the isolator devices have a housing, which has a first surface and a second surface that together at least partially define a perimeter of the housing and is configured for attachment to the airframe; an engine attachment component configured for attachment to the engine interface and disposed at least partially inside of the housing; and a plurality of elastomeric elements disposed on or over each of the first and second surfaces of the housing The plurality of elastomeric elements are spaced apart from the engine attachment component via the housing for improved heat dissipation from the engine, reducing operational temperatures of the elastomeric elements to prolong their use.

23 Claims, 9 Drawing Sheets

(51) Int. Cl.
  *B64C 27/00* (2006.01)
  *F16F 15/02* (2006.01)
  *F02C 7/20* (2006.01)

(52) U.S. Cl.
  CPC .......... *B64C 2027/003* (2013.01); *F02C 7/20* (2013.01); *F05D 2260/96* (2013.01); *Y02T 50/40* (2013.01)

(58) Field of Classification Search
  USPC ....... 248/560, 603, 604, 634, 638, 554, 555, 248/556, 557
  See application file for complete search history.

(56) References Cited

U.S. PATENT DOCUMENTS

| | | |
|---|---|---|
| 4,416,446 A | 11/1983 | Murakami |
| 4,821,980 A | 4/1989 | Clausen et al. |
| 5,065,959 A | 11/1991 | Bhatia et al. |
| 5,176,339 A | 1/1993 | Schmidt |
| 5,190,269 A | 3/1993 | Ikeda et al. |
| 5,667,202 A * | 9/1997 | Gwinn ...................... F16F 3/10 267/140.2 |
| 6,065,742 A | 5/2000 | Whiteford |
| 6,715,746 B2 | 4/2004 | Bachmeyer et al. |
| 6,758,466 B2 | 7/2004 | Russell |
| 7,017,858 B2 | 3/2006 | Roson et al. |
| 7,549,620 B2 | 6/2009 | Kang |
| 8,020,831 B2 | 9/2011 | Dron et al. |
| 8,646,724 B2 | 2/2014 | Bonnet et al. |
| 9,038,789 B2 | 5/2015 | West et al. |
| 9,175,739 B2 | 11/2015 | Ohnishi et al. |
| 10,215,195 B2 * | 2/2019 | Frampton ............. F04D 29/668 |
| 10,432,058 B2 * | 10/2019 | Berkouk ............... F04D 29/668 |
| 2009/0212185 A1 * | 8/2009 | Horgas ................... F16F 15/08 248/298.1 |
| 2016/0009403 A1 | 1/2016 | Kumar et al. |
| 2017/0158355 A1 * | 6/2017 | Caywood .............. B64C 27/467 |

OTHER PUBLICATIONS

Written Opinion and International Search Report for Application No. PCT/US2017/032353 dated Nov. 16, 2017.

* cited by examiner

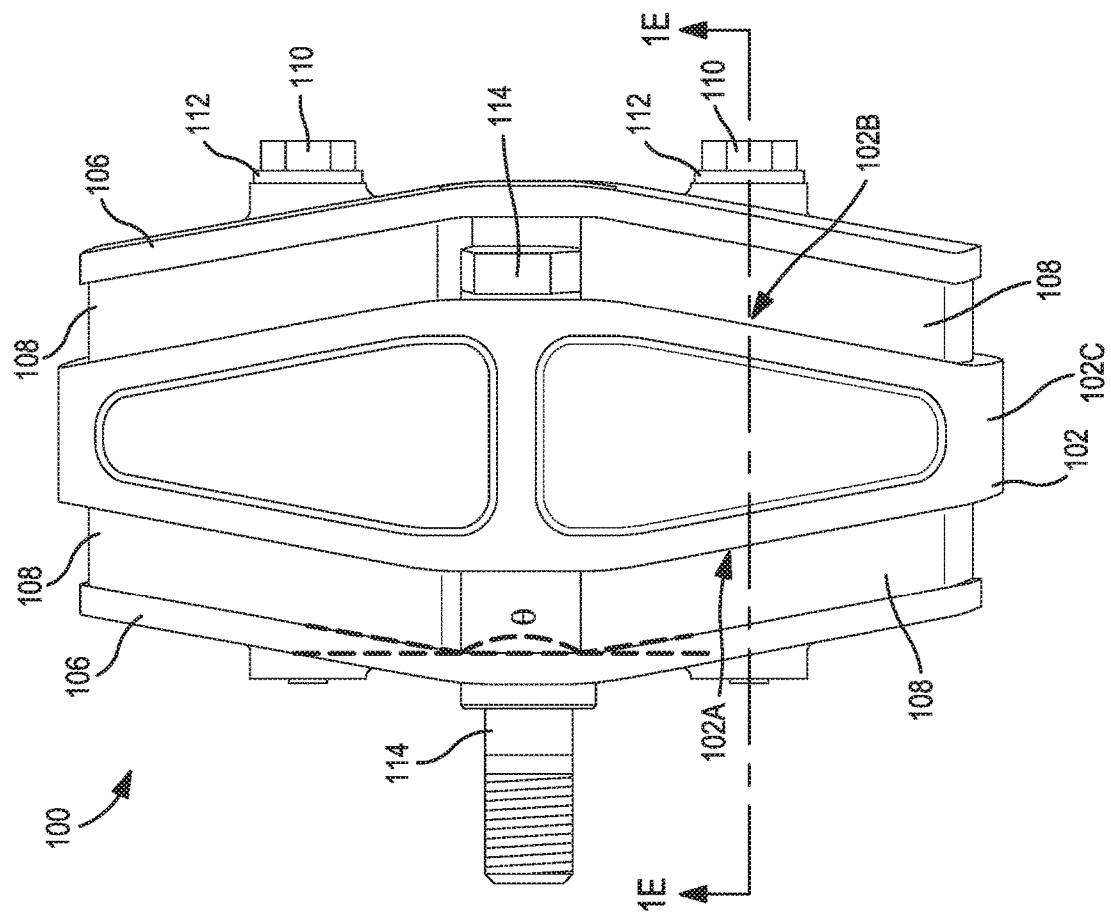
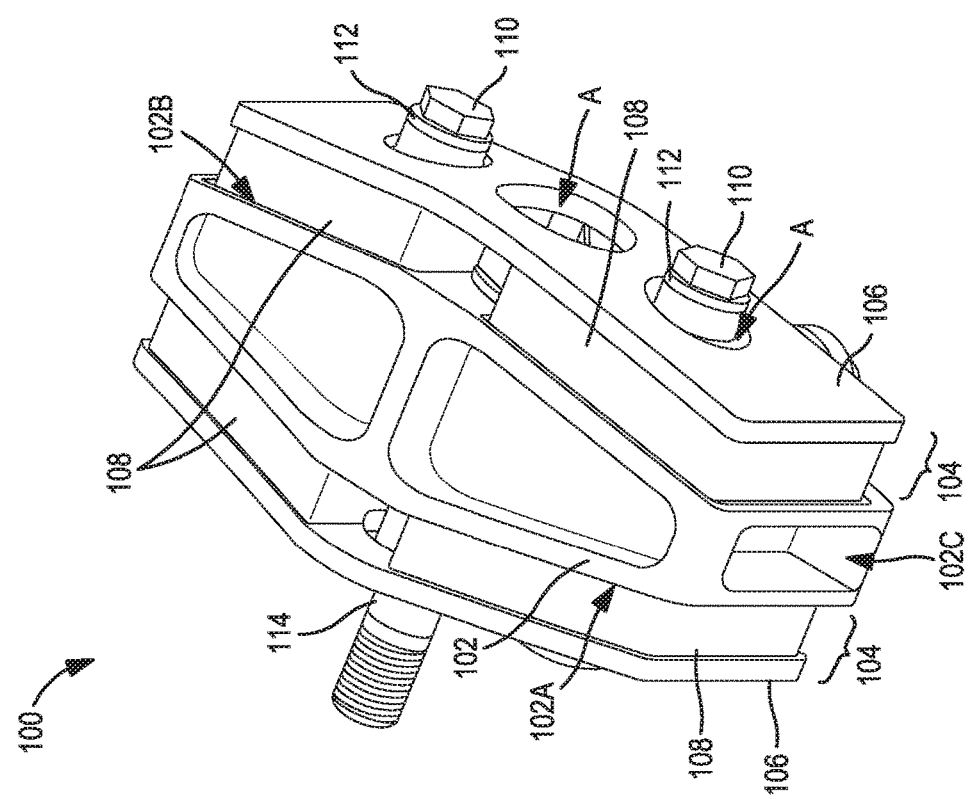
FIG. 1A
FIG. 1B

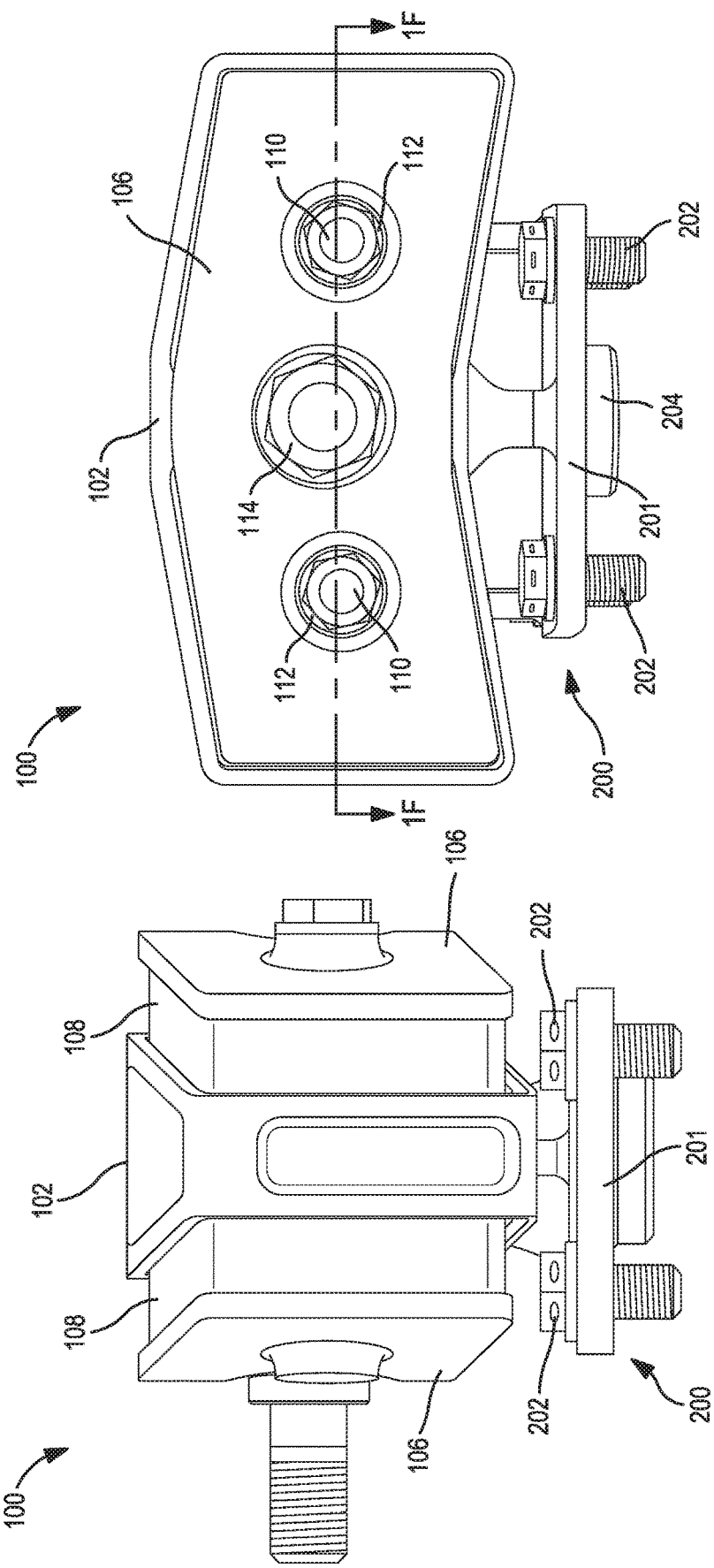

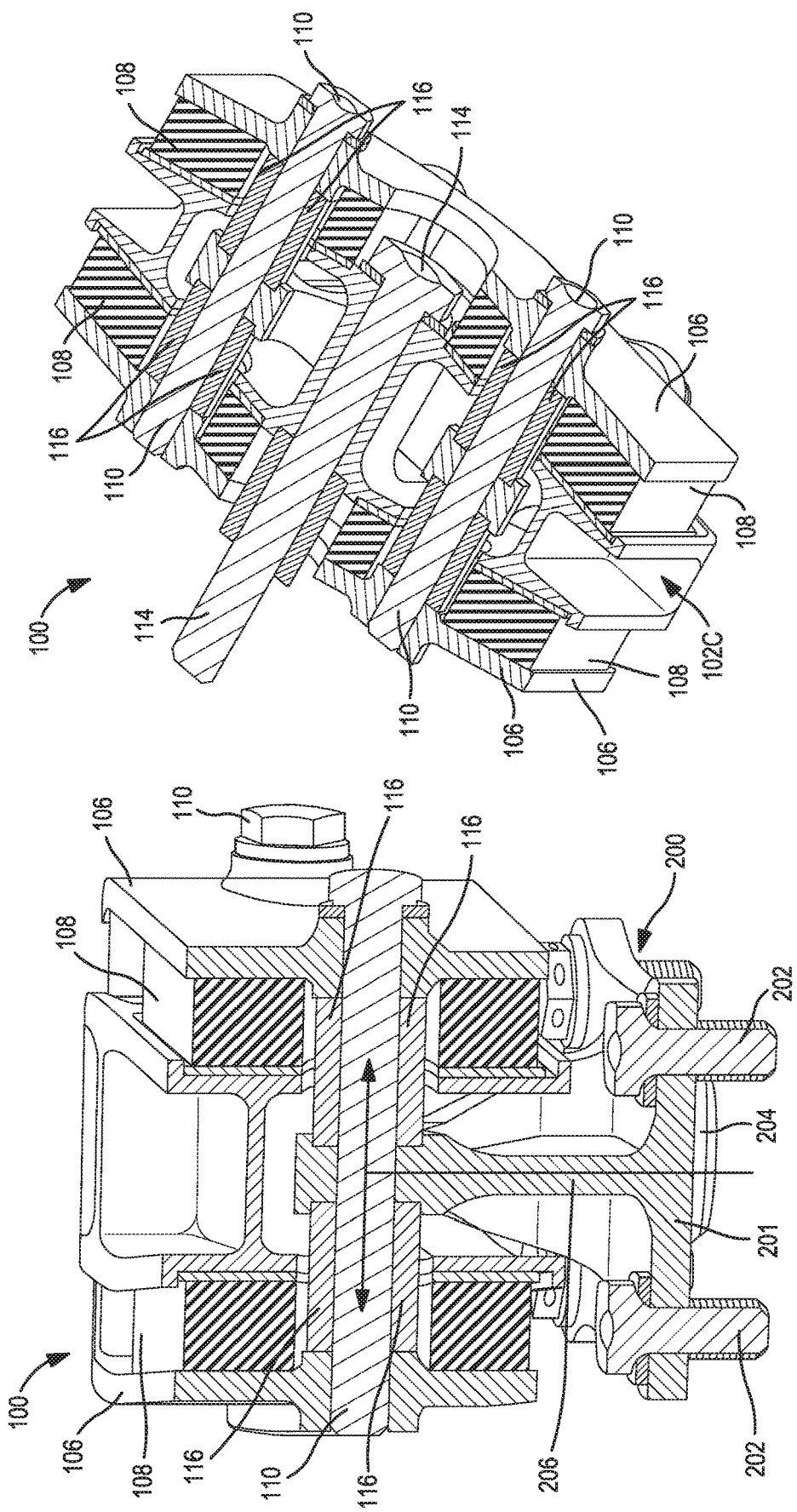

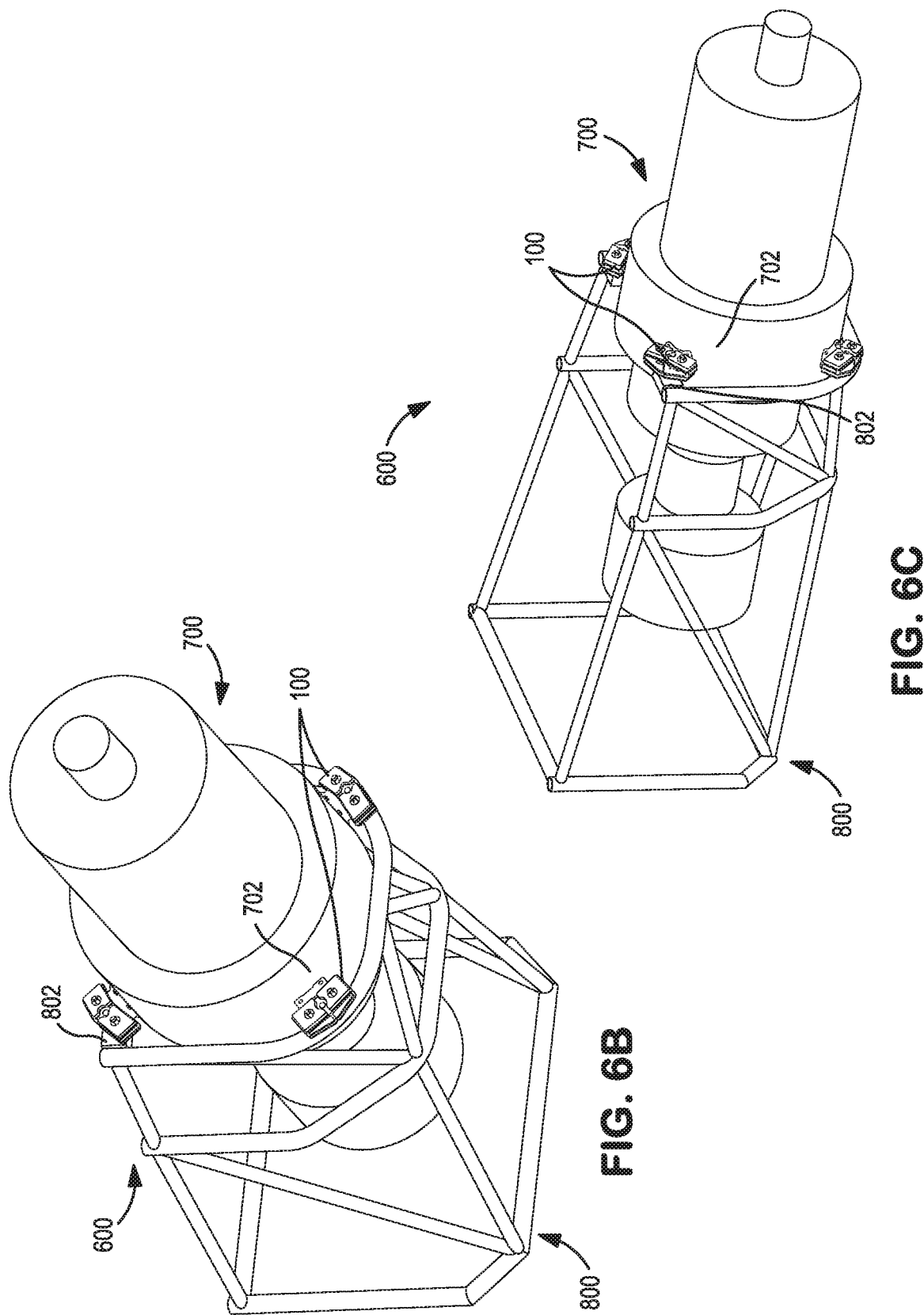

ISOLATOR DEVICES, SYSTEMS AND METHODS FOR AIRCRAFT

CROSS-REFERENCE TO RELATED APPLICATIONS

This application relates and claims priority to U.S. Provisional Patent Application Ser. No. 62/336,003, filed on May 13, 2016, the disclosure of which is incorporated by reference herein in its entirety.

TECHNICAL FIELD

The subject matter herein relates generally to isolator devices, systems, and methods, which are configured to react loads for supporting and protecting equipment. The subject matter herein more particularly relates to isolator devices, systems, and methods, which are configured to support and protect avionics equipment from vibrations induced via an aircraft engine, such as a turboprop engine.

BACKGROUND

As aircraft engines have evolved, they have become more powerful and more efficient. Evolving aircraft engines also generate more heat, maybe even several hundred degrees more than conventional engines during takeoff, flight, and landing. At the same time, aircraft, in general, are higher performing and subjected to more extreme loading conditions.

Isolators may be provided at various points about aircraft structures and/or aircraft equipment for isolating and protecting the aircraft structures or equipment from experiencing excessive vibrations, noise, loads, fatigue, or the like. Isolators are configured to isolate some structures or equipment from other, vibrating structures or equipment to mitigate transmission of vibration and/or loads. For example, isolators may be provided at various points between an aircraft engine (e.g., a turboprop engine) and airframe members for inhibiting, mitigating, or otherwise minimizing the transmissibility of vibrations and/or loads from the engine to the airframe members.

Conventional isolators sometimes incorporate silicone or other synthetic elastomers for improved temperature resistance. However, conventional isolators are problematic, as the higher-temperatures generated by evolving aircraft engines can quickly degrade these lower strength synthetic elastomers. This degradation can severely limit or otherwise negatively affect the useful life of the isolator, reducing the isolator's ability to isolate vibrations and loads.

Accordingly, a need exists for isolator devices, systems, and methods for aircraft having improved thermal resistance and/or cooling efficiency to allow the continued use of higher strength natural rubber (NR), and NR blends.

SUMMARY

In accordance with this disclosure, aircraft isolator devices, systems, and methods are provided. In some aspects, an isolator device includes a housing comprising: a first surface and a second surface, wherein the first and second surfaces at least partially define a perimeter of the housing; an engine attachment component disposed at least partially inside of the housing; and a plurality of elastomeric elements disposed on or over each of the first and second surfaces of the housing, wherein the plurality of elastomeric elements are spaced apart from the engine attachment component via the housing for improving dissipation of heat from the engine attachment component.

In some other aspects, an isolator system includes: an engine interface; an airframe; and a plurality of isolator devices attached to the engine interface and the airframe. According to this aspect, each of the plurality of isolator devices includes: a housing comprising a first surface and a second surface, wherein the first and second surfaces at least partially define a perimeter of the housing, and wherein the housing is configured for attachment to the airframe; an engine attachment component disposed at least partially inside of the housing, wherein the engine attachment component is configured for attachment to the engine interface; and a plurality of elastomeric elements disposed on or over each of the first and second surfaces of the housing, wherein the plurality of elastomeric elements are spaced apart from the engine attachment component via the housing for improving dissipation of heat from the engine attachment component.

In still other aspects, a method of damping vibration includes: providing an engine interface; providing an airframe; and providing a plurality of isolator devices between the engine interface and the airframe, wherein each of the plurality of isolator devices comprises: a housing comprising a first surface and a second surface, wherein the first and second surfaces at least partially define a perimeter of the housing, and wherein the housing is configured for attachment to the airframe; an engine attachment component disposed at least partially inside of the housing, wherein the engine attachment component is configured for attachment to the engine interface; and a plurality of elastomeric elements disposed on or over each of the first and second surfaces of the housing, wherein the plurality of elastomeric elements are spaced apart from the engine attachment component via the housing for improving dissipation of heat from the engine attachment component. The method further includes: attaching the engine attachment component of each of the plurality of isolator devices to the engine interface; and attaching the housing of each of the plurality of isolator devices to the airframe via at least one connecting member.

Numerous objects and advantages of the inventive subject matter will become apparent as the following detailed description of the preferred embodiments is read in conjunction with the drawings, which illustrate such embodiments.

BRIEF DESCRIPTION OF THE DRAWINGS

FIGS. 1A-1F are various views of an isolator device and/or system according to an embodiment of the presently disclosed subject matter.

FIGS. 6A-6C are schematic block diagrams of isolator systems according to an embodiment of the presently disclosed subject matter.

DETAILED DESCRIPTION

Figure 2:
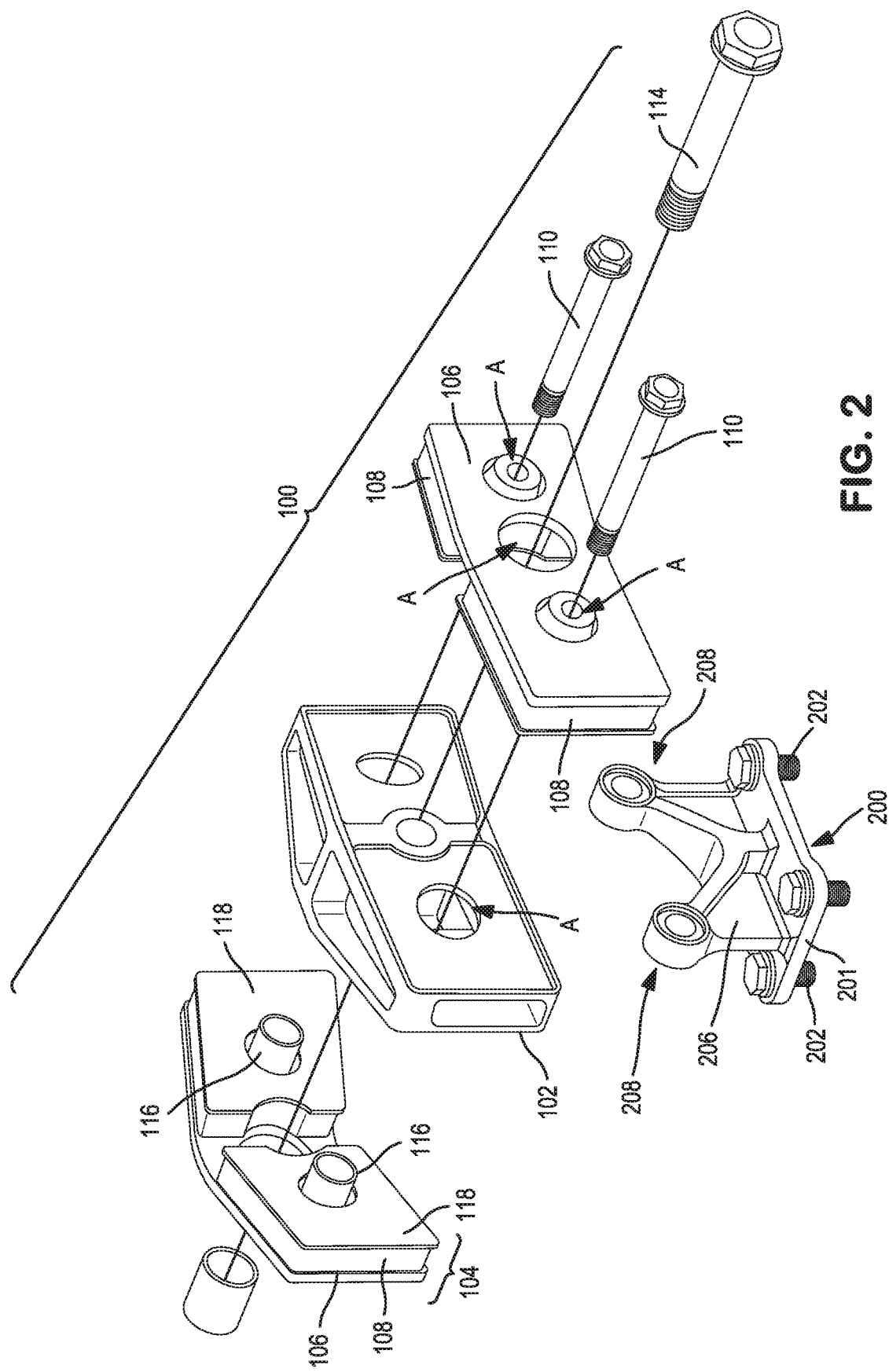
FIG. 2 is an exploded view of an isolator device and/or system according to an embodiment of the presently disclosed subject matter.

Figures (also "FIGS.") 1A-6C illustrate various views, embodiments, and/or aspects associated with isolator devices, systems, and related methods by which the operable life of structural components associated with aircraft machinery or avionics equipment may be extended.

In some embodiments, isolator devices, systems, and methods herein incorporate elastomer structures and materials, such as natural rubber structures, elements, and/or materials for tuning the stiffness along a load path for reacting loads received from at least one vibrating component or structure, such as an aircraft engine. A length of the thermal conduction path (e.g., a thermally conductive path along which heat is transmitted) within the isolator devices and systems herein is lengthened compared to legacy isolators, in which the elastomeric elements interface directly against an engine-attachment bracket (see, e.g., FIGS. 1C-1E, 200), thus improving heat dissipation over this longer thermal conduction path. In some embodiments, the thermal conduction path is lengthened by a separate housing being disposed around an engine attachment component or bracket. Thus, the thermal energy (e.g., heat) transmitted into the isolator is reduced because the heat dissipates into ambient air (e.g., by convective or radiative cooling) or other structures along the lengthened thermal conduction path before the heat is conductively transferred to the elastomeric structures, elements, and/or materials.

In some embodiments, isolator devices described herein are disposed between portions of an aircraft engine (e.g., an engine frame, engine case, or the like), and one or more additional or adjacent support members, such as adjacent airframe members, trusses, collar members, connection members, struts, bars, rods, tubes, or the like. These isolator devices and systems herein are configured to reduce or inhibit transmission of loads and/or vibration from the aircraft engine to non-vibrating support members or structures (e.g., structural components, such as struts, rods, trusses, collars, or the like).

Isolator devices include an engine attachment component (e.g., a bracket) configured to rigidly connect a first portion of the isolator to an aircraft engine, or a portion thereof, and a centralized airframe attachment component (e.g., a connecting member or bolt) configured to rigidly connect a second portion of the isolator device to an airframe, or a portion thereof. As some portions of the isolator device move with the aircraft engine, elastomeric elements are configured to react loads and inhibit these loads from being transferred to the airframe. The engine attachment component (e.g., bracket) is a heat-bearing, hot component, which is spaced apart from the elastomeric elements that react the loads transmitted from the aircraft engine. This spacing apart of the elastomeric elements and aircraft engine inhibits heat transfer between the aircraft engine and the elastomeric elements, thereby preventing or reducing significant degradation of the elastomeric elements, lengthening a service life of such isolator devices.

In some embodiments, isolator devices, systems, and methods disclosed herein are configured for high-temperature aircraft engine installations. These installations may include, for example, installation of one or more planar-mounted isolator devices connecting to a turboprop engine, although it is not limited to such applications. In some embodiments, isolator devices, systems, and methods herein are configured for use in engines operable in a range of about 500 through about 2000 shaft horsepower (SHP) (e.g., about 3,678 kilowatts to about 14,710 kilowatts).

In some embodiments, isolator devices, systems, and methods herein include a lengthened thermal conduction path (e.g., along metallic components within the isolator devices) that increases the amount of surface area for heat dissipation. The thermal conduction path is lengthened, in some aspects, via a housing structure disposed over and/or around portions of highest temperature part (e.g., the engine attachment component). The isolator encounters heat at an engine interface surface, and effectively dissipates a majority of the heat before it reaches elastomeric elements. For example, isolator devices and systems herein provide a sufficient amount of surface area between where it is mounted to an engine interface (e.g., via a component or bracket) and the elastomeric elements. Thermal energy in the form of heat is dissipated such that isolator components are "cooled" before the thermal energy reaches the elastomeric elements. This heat dissipation can significantly reduce the exposure of the elastomeric elements to thermal energy and allows the isolator devices and systems to be designed with lower-temperature elastomers (e.g., natural rubber, ethylene propylene diene monomer (M-class) rubber (EPDM), or the like), which are stronger and have better fatigue properties. Isolator devices, systems, and methods herein are accordingly beneficial as having a longer-life, which will be less prone to drift, set, and thermal age-stiffening.

In some embodiments, isolator devices, systems, and methods herein are operable at lower and higher temperatures. For example, the higher temperatures include temperatures ranging from about 100 degrees Fahrenheit (° F.) (about 38 degrees Celsius (° C.)) or more, about 200° F. (about 93° C.) or more, about 400° F. (about 204° C.) or more, about 500° F. (about 260° C.) or more, about 700° F. (about 371° C.) or more, and engine cases heated to about 900° F. (about 482° C.) or more.

In some embodiments, isolator devices, systems, and methods herein include a plurality of elastomeric elements having a maximum elastomer temperature at about 200° F. to about 600° F. (about 93° C. to about 316° C.). Isolator devices, systems, and methods herein advantageously dissipate heat from engine cases and/or components that are operating at temperatures in excess of the maximum elastomer temperature, so that the heat dissipation occurs before the heat is transferred into the elastomeric elements, so they do not exceed their maximum elastomer temperature or "burn out."

In addition to the reduction in thermal degradation of the elastomeric elements, isolator devices, systems, and methods herein are configured to react radial loads (e.g., loads perpendicular to an engine case surface), tangential (e.g., torque) loads, and forward (e.g., thrust) loads generated at an aircraft engine via a combination of shear and compression in the elastomeric elements. This combination of load reactions advantageously provides more robust isolator devices and systems that are less prone to having overstressed and/or degraded elastomeric elements. In some embodiments, elastomeric elements are configured in an angled or chevron shape for reacting loads via a combination of shear and compression.

Furthermore, in some embodiments, isolator devices and systems herein include an attachment flange or bracket disposed between an isolator housing (e.g., housing member) and engine frame or case. In some particular embodiments, for example, the bracket includes an optional lower projection (e.g., a shear boss or key) that allows the bracket to be designed to allow additional airflow between portions thereof for further improving the cooling efficiency of the isolator device. Providing additional airflow between isolator components more readily dissipates heat by convective cooling, allowing for the elimination of otherwise needed conductive material for significant weight savings.

In some embodiments, isolator devices, systems, and methods herein include interlocked or threaded metallic components (e.g., bolts, screws, or the like), which provide a fireproof load-path. The interlocked metallic components allow the opportunity for hard-snubbing at excessive loads thereby providing superior load deflection.

Although turboprop engines are shown, described, and/or discussed herein, isolator devices and systems are not limited thereto. Rather, turboprop engines are shown and described for exemplary purposes only. Isolator devices, systems, and methods herein may be used to soften or react loads associated with any type of engine (e.g., turbojet, turbofan, etc.) and/or any type of rotating or vibrating equipment.

Isolator devices, systems, and methods set forth herein may be used in many different applications, not limited to isolating loads and vibrations generated via aircraft engines, and may be provided, for example, to react loads associated with any type of high-speed rotating equipment, machinery, vehicle system, engine system, turbine system, or the like.

Referring to FIGS. 1A-6C, several non-limiting, embodiments of isolator devices, systems, and methods are illustrated. As each of the figures is an example embodiment, some elements and/or the functionality thereof may be combined, separated, integrated, and/or modified while remaining within the scope of the claims.

Referring to FIGS. 1A-1F, various views of an isolator device, generally designated 100, provided for use in an isolator system (e.g., 300, FIG. 6A) according to an embodiment of the presently disclosed subject matter are shown.

FIG. 1A is a perspective view of isolator device 100. Isolator device 100 is configured to attach to a first attachment surface (e.g., 402, FIG. 6A) and a second attachment surface (e.g., 502, FIG. 6A), the attachment surfaces being substantially orthogonal with respect to each other, and being disposed in and/or on an aircraft. One attachment surface is disposed on an engine (e.g., an engine frame, case, etc.) and the other attachment surface is disposed on an airframe, or a portion thereof (e.g., a truss, strut, etc.). In some embodiments, the airframe attachment surface includes a surface of a support member or support structure (e.g., a surface of a truss, a beam, a rod, a strut, a collar, a bar, or the like). Isolator device 100 is configured to isolate the support member from vibrations and/or loads transmitted by the engine.

In some embodiments, isolator device 100 is referred to as a "mount" that is mounted, attached, or otherwise disposed between portions of an aircraft engine and a support member of an airframe. In some particular embodiments, a plurality of isolator devices 100 are mounted at various points about the engine (e.g., about an engine case, frame, or the like), thereby forming an isolator system (e.g., 300, FIG. 6A) for inhibiting transmission of loads into a plurality of support members.

Referring now to the embodiment illustrated in FIGS. 1A-1B, isolator device 100 includes a housing member or housing 102 and a plurality of load reacting structures 104 disposed about housing 102. In some embodiments, load reacting structures 104 are disposed around a perimeter of housing 102 and on opposing surfaces or faces of housing 102 for providing radial, forward, and torque load reactions (see, e.g., FIG. 4). One of the load reacting structures 104 is referred to as an "aft" structure that faces an airframe or support member. The other load reacting structure is referred at as a "forward" structure, which faces an engine. The large arrow on top of housing 102 in the figures points towards the forward ones of load reacting structures 104.

In some embodiments, load reacting structures 104 include one or more plates 106 and one or more elastomeric elements 108. In the illustrated configuration, elastomeric elements 108 are sandwiched between and thus contacting housing 102 and the one or more plates 106. In some embodiments, only one elastomeric element 108 is disposed between a surface of housing 102 and each respective plate 106. In other embodiments, a plurality of elastomeric elements 108 are disposed between a surface of housing 102 and each respective plate 106. For example, as FIGS. 1A-1B illustrate, multiple elastomeric elements 108 are disposed on, over, and/or against a first side or surface, generally designated 102A, of housing 102, and multiple elastomeric elements 108 are disposed on, over, and/or against a second side or surface, generally designated 102B, of housing 102, which opposes first surface 102A. First and second surfaces 102A and 102B are outermost external surfaces defining a perimeter of housing 102 and are configured as interfacing surfaces of housing 102 for elastomeric elements 108 (see, e.g., FIGS. 3C and 3D).

Each elastomeric element 108 reacts loads via a combination of compression and shear, for example, by virtue of providing portions of load reacting structures 104 and housing 102 in a "chevron" shape or design. For example, FIG. 1B is a side view of isolator device 100 that includes a centrally disposed housing 102 having non-planar respective first and second surfaces 102A and 102B. At least one elastomeric element 108 is provided on or over the non-planar respective first and second surfaces 102A and 102B. In some embodiments, multiple elastomeric elements 108 are spaced apart from each other and provided over portions of non-planar first and second surfaces 102A and 102B of housing. For example and in some embodiments, at least two elastomeric elements 108 are disposed along each of respective first and second surfaces 102A and 102B of housing 102, and the at least two elastomeric elements 108 are angled with respect to each other. That is, the adjacent elastomeric elements 108 are disposed in a non-linear arrangement having an angle θ disposed therebetween. Angle θ may include an acute or obtuse angle. As FIG. 1B illustrates and in some embodiments, elastomeric elements 108 are obtusely angled with respect to each other. Similarly, in some embodiments, plates 106 are also non-planar (e.g., non-linear in a sectional view) and/or have a non-planar surface for retaining elastomeric elements against portions of housing 102. In some embodiments, plates 106, elastomeric elements 108, and surfaces of housing 102 (e.g., 102A, 102B) are angled in a tangential direction (e.g., in a V-shape) for providing torque reaction.

Still referring to FIGS. 1A-1B, housing 102 includes a plurality of apertures, generally designated A (see, e.g., FIG. 2), configured to receive a respective retaining member or metallic component (e.g., mechanical connectors, threaded nut-and-bolt connectors, screws, pins, rods, or the like). For example, at least one aperture A is configured to receive at least one connecting member 110 configured to provide precompression of load reacting structures 104 against housing 102. At least one other aperture A is configured to receive at least one other connecting member 114 that has a larger diameter compared to diameter(s) of connecting members 110. Connecting member 114 is configured to attach or mount isolator device 100 to an airframe or portion thereof. Each connecting member 114 and 110 interlocks with (e.g., threadingly engages) portions of isolator device 100 to form load paths and/or thermal conduction paths therethrough. In some embodiments, multiple connecting members (e.g., 110, 114) are provided per isolator device 100.

In the embodiment illustrated in FIGS. 1A-1B, connecting member 114 is centrally disposed with respect to housing 102, extends through housing 102, and interlocks with housing 102 to rigidly attach housing 102 of isolator device 100 to an airframe, a surface on an airframe, or a surface on a portion of an airframe. In this embodiment, connecting members 110 are disposed on opposing sides (e.g., lateral sides) of larger diameter connecting member 114 and extend through portions of plates 106, elastomeric elements 108, and housing 102 to provide precompression. In some embodiments, a washer 112 is disposed between portions of each metallic component (e.g., connecting members 110, 114) and portions of housing 102, where desired. In some embodiments, housing 102 comprises metal (e.g., titanium, steel (e.g., 15-5PH and 17-4PH), nickel, aluminum, or the like, which may be a light weight metal or metal alloy), which is configured to lengthen or separate load reacting structures 104 a distance away from a heated component (e.g., an engine flange, bracket, or engine attachment component 200), thereby increasing the length of the thermal conduction path within isolator device 100.

Increasing the length of the thermal conduction path within isolator device 100 allows for a greater proportion of heat to be dissipated (e.g., by convective and/or radiative cooling) before the heat is transferred into elastomeric elements 108 at isolator device 100. As discussed above, excessive heating of elastomeric elements 108 renders the elements susceptible to premature degradation and/or failure. Thus, plate 201 and spacer bushings 116 advantageously protects elastomeric elements 108 from heat by increasing the distance (e.g., the thermal conduction path) between elastomeric elements 108 and an engine. In some embodiments, housing 102 also includes at least a partially hollow structure having one or more (e.g., a plurality of) "pockets" or openings, generally designated 102C, disposed therein. Openings 102C are configured to allow for improved convective heat transfer, so that heat is convectively transferred into the ambient air in the plurality of pockets or openings 102C, which further improves thermal management within isolator device 100 and prevents degradation of elastomeric elements 108.

FIGS. 1C and 1D are respective side views of an isolator device 100 as mounted or attached to an engine attachment component, such as a metallic flange or mounting bracket, referred to as an engine attachment component, generally designated 200. Engine attachment component 200 can comprise a metal, such as a high temperature steel (15-5PH, 17-4PH, or the like), nickel, or metal alloy (e.g., Inconel), or the like. Engine attachment component 200 is configured to attach to isolator device 100 via connecting members 110 that extend through portions of engine attachment component 200 and load reacting structures 104. For example, connecting members 110 extend through plates 106, elastomeric elements 108, and portions of engine attachment component 200 for connecting and compressing isolator device 100 against engine attachment component 200. As the engine moves, engine attachment component 200, which connects the engine to load reacting members 104, and load reacting members 104 move against portions of housing 102 to react loads via compressing and shearing elastomeric elements 108. In some embodiments, engine attachment component 200 includes a bracket configured to attach to an engine, or a portion thereof. The bracket includes a T-shape in a cross-sectional view and V-shaped attachment portions, generally designated 208, in a perspective view.

Still referring to FIGS. 1C-1D, engine attachment component 200 includes a lower plate 201, which is configured to mount or attach isolator device 100 to an engine (not shown) or portions thereof (e.g., an engine case, engine frame, or the like), via one or more connecting members 202. Connecting members 202 may include threaded components such as bolts, nut and bolt connectors, screws, pins, or the like that interlock with an engine (e.g., an engine case or frame) for attaching engine attachment component 200 to the engine. Connecting members 202 are configured to extend into and/or through portions of the engine (e.g., engine frame, case, or the like) and plate 201, thereby securing engine attachment component 200 and isolator device 100 to the engine (not shown). Isolator device 100 is configured to react loads and/or vibration generated at engine (not shown), thereby inhibiting transmission of the loads and/or vibrations into the airframe and/or other structures throughout an aircraft. Isolator device 100 reacts loads via one or more elastomeric elements 108, and can be devoid of fluid. Isolator devices 100 advantageously prevent avionic structures and equipment from vibrations, fatigue, and loads.

As illustrated in FIG. 1D, isolator device 100 attaches to engine attachment component 200 via one or more connecting members 110 extending therethrough, for example, connecting members 110 extending through load reacting structures 104, housing 102, and engine attachment component 200. Isolator device 100 attaches to engine attachment component 200, and engine attachment component 200 is configured to attach to an aircraft engine (not shown) or portion thereof. That is, engine attachment component 200 facilitates connection of isolator device 100 to an aircraft engine (not shown). Engine attachment component 200 experiences the most heat, as it interfaces directly with a portion of engine (e.g., the heat source). In some embodiments, engine attachment component 200 includes a metallic body that extends internally within (e.g., inside) a portion of housing 102 such that spacer bushing 116 and plate 106 dissipates heat from engine attachment component 200, thereby improving heat sinking and heat dissipating capabilities of isolator device 100.

As FIG. 1D further illustrates, connecting member 114 is configured to attach isolator device 100 to an airframe (not shown). Connecting member 114 extends through portions of housing 102 and an airframe surface for rigidly coupling the isolator device 100 to the airframe. Notably, connecting member 114 does not extend through engine attachment component 200. That is, engine attachment component 200 includes a recess (e.g., 210, FIG. 3A) that allows connecting member 114 to bypass and avoid engine attachment component 200, thereby allowing load reacting structures 104 to move with the engine as the engine moves for deflecting vibrations and loads.

For example, isolator device 100 is configured such that housing 102 is rigidly connected to the airframe, while one or more plates 106, 118 (see, e.g., FIG. 2) that are sandwiched around elastomeric elements 108 are rigidly connected to engine attachment component 200. As such, plates 106, 118 (see, e.g., FIG. 2) are configured to move with the engine. The relative motion between plates 106, 118 (FIG. 2) and housing 102 is accommodated by elastomeric elements 108.

FIGS. 1E-1F are cross-sectional views of isolator device 100 and engine attachment component, generally designated 200. The cross-sectional view illustrated in FIG. 1E is taken along the sectional line 1E-1E, as shown in FIG. 1B. The cross-sectional view illustrated in FIG. 1F is taken along the sectional line 1F-1F, as shown in FIG. 1D. The arrows shown in FIG. 1E illustrate both the thermal conduction path and the primary load path through isolator device 100 and engine attachment component 200. Heat is generated at an engine (not shown), which is coupled or attached to plate 201 of engine attachment component 200 via connecting members 202. Heat travels into engine attachment component 200 from the engine via a flange or shear boss 204, along a bracket or component body 206, and then into portions of connecting members 110. As the heat travels along connecting members 110, it dissipates through openings or recesses in engine attachment component 200 and spacer bushings 116. Spacer bushings 116 may be an integral part of outer plate 106, and configured to as to decrease before reaching elastomeric elements 108. Thus, isolator device 100 includes a lengthened thermal conduction path, improving the thermal management and heat dissipation therein. Isolator device 100 is accordingly configured to withstand higher temperatures compared to conventional isolator configurations while utilizing lower temperature elastomeric elements 108 (e.g. made from natural rubber), which are stronger and have better fatigue properties than elastomeric materials capable of withstanding higher operating temperatures.

As FIG. 1E further illustrates, one or more spacer bushings 116 or bushings are disposed around connecting members 110 for holding the isolator together and providing precompression in elastomeric elements 108. Spacer bushings 116 may be made from thermally non-conductive materials (e.g., thermally insulating) and are disposed in an annular gap between connecting members 110 and load reacting structures 104. In some embodiments, spacer bushings 116 are configured to isolate connecting members 110 from load reacting structures 104 so that heat is not directly conducted into elastomeric elements 108. In some embodiments, spacer bushings 116 are disposed on inner and/or outer plates (e.g., 118, 106) of load reacting structures 104.

A snubbing clearance gap is maintained between housing 102 and spacer bushings 116. This snubbing clearance gap is sized to limit the amount of motion in the radial and tangential directions (see, e.g., FIG. 4) under extreme loading conditions. Additionally, it provides a fire-proof redundant load-path, which is required under different discrete-source damage or fire scenarios. Even if assuming all elastomeric elements 108 are burned away, engine attachment component 200 will rest against the housing 102 and spacers 118, providing the force reaction that is required to restrain the engine for continued safe carry-home flight.

As FIG. 1F illustrates, connecting members 110 extend through portions of plates 106, elastomeric elements 108, housing 102, engine attachment component 200, and spacer bushings 116. Notably, portions of engine attachment component 200 are received inside openings of housing 102 and spaced apart therefrom via pockets or openings 102C in housing 102. As FIG. 1F further illustrates, larger diameter connecting member 114 extends through portions of housing 102 to rigidly connect housing to a surface of an airframe (not shown) or a portion thereof. As the engine induces movement of engine attachment component 200, loads and vibrations are reacted as load reacting structures 104 move against engine attachment component 200 and housing 102. Having the primary airframe-to-isolator connection via connection member 114 provided at a center of isolator device 100 reduces a moment reaction and improves deflection of loads.

FIG. 2 is an exploded view of isolator device 100 and engine attachment component 200. As FIG. 2 illustrates, housing 102 is fitted over the engine attachment component 200. Engine attachment component 200 comprises a plate 201 for connecting to an engine (not shown) and a body 206 extending upwards therefrom. A portion of engine attachment component 200 is recessed (see, e.g., 210, FIG. 3A) between two attachment portions 208. This recessed portion is provided so that connecting member 114 bypasses engine attachment component 200 and also for weight reduction.

Once housing 102 is placed over engine attachment component 200, precompression connecting members 110 are inserted through load reacting structures 104, housing 102, and attachment portions 208 of engine attachment component 200. Connecting members 110 are fitted within spacer bushings 116, thereby retaining the bolts and compressing elastomeric elements 108 between plates 106, 118 and housing 102 surfaces. A further optional retention plate 118 may be disposed between respective elastomeric elements 108 and housing 102, where desired. That is, in some embodiments, each elastomeric element 108 is sandwiched and precompressed between two plates 106 and 118.

A larger diameter, centralized connecting member 114 is inserted through load reacting structures 104 and housing 102 for attaching isolator device 100 to an airframe (not shown). Engine attachment component 200 is configured to facilitate connection between isolator device 100 and a surface of an engine (not shown) or a portion thereof. Isolator device 100 is configured to attach to a surface of an airframe (not shown) via connecting member 114. In some embodiments, the surfaces of the engine and airframe are planar surfaces that are orthogonally disposed with respect to each other.

Figure 3B:
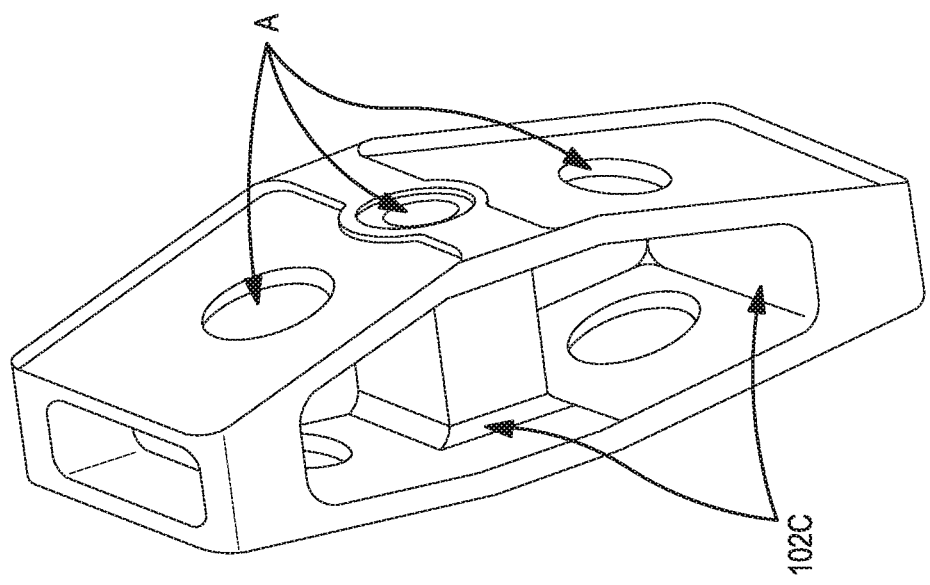
FIGS. 3A-3D are various views of portions of an isolator device and/or system according to an embodiment of the presently disclosed subject matter.
Figure 3A:
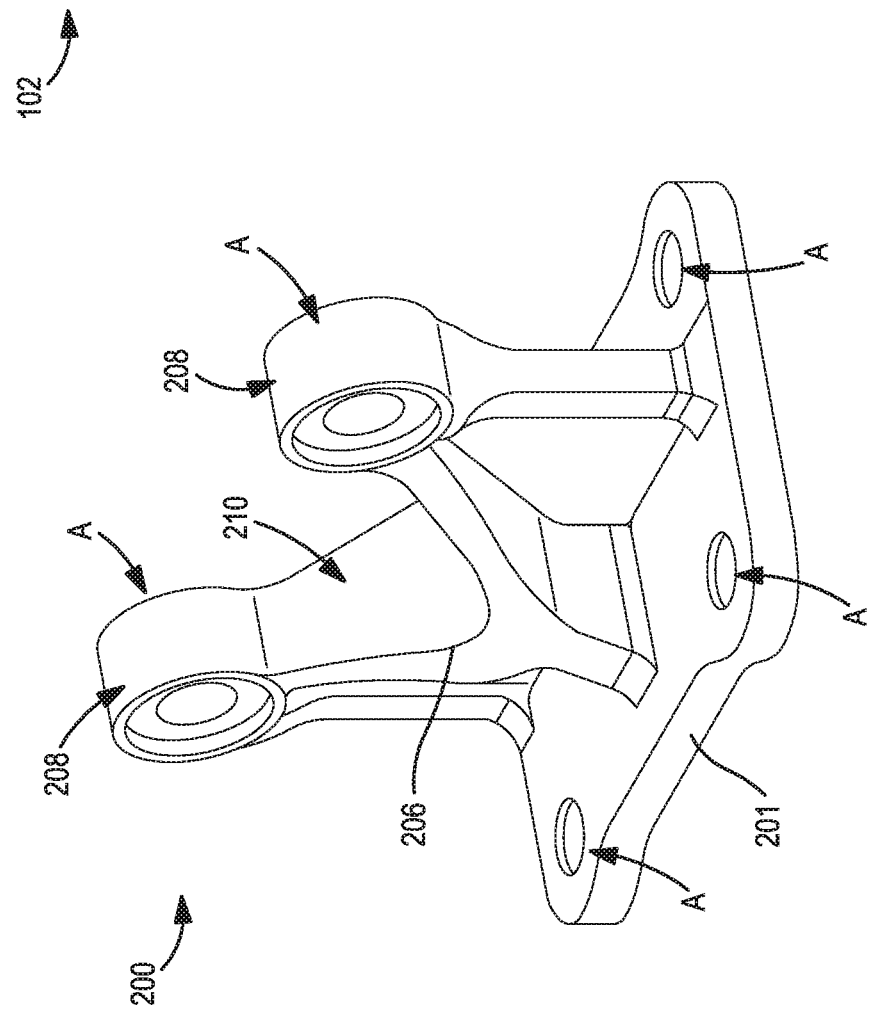

FIGS. 3A-3D are various views of portions of an isolator device and system. FIG. 3A is a perspective view of engine attachment component 200. Engine attachment component 200 includes a substantially planar lower plate 201 and a body 206 extending therefrom. The body includes a recessed portion, generally designated 210, disposed between two or more attachment portions, generally designated 208. Each attachment portion 208 includes at least one aperture, generally designated A, for receiving a connecting member (see, e.g., 110, FIG. 1A) to connect engine attachment component 200 to isolator device 100.

Figure 3D:
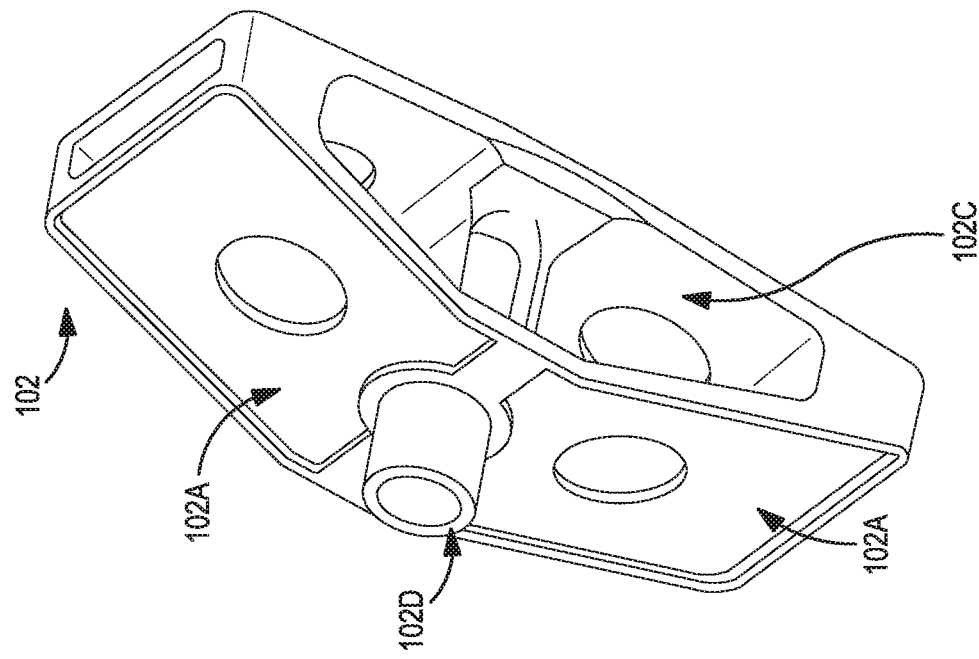
Figure 3C:
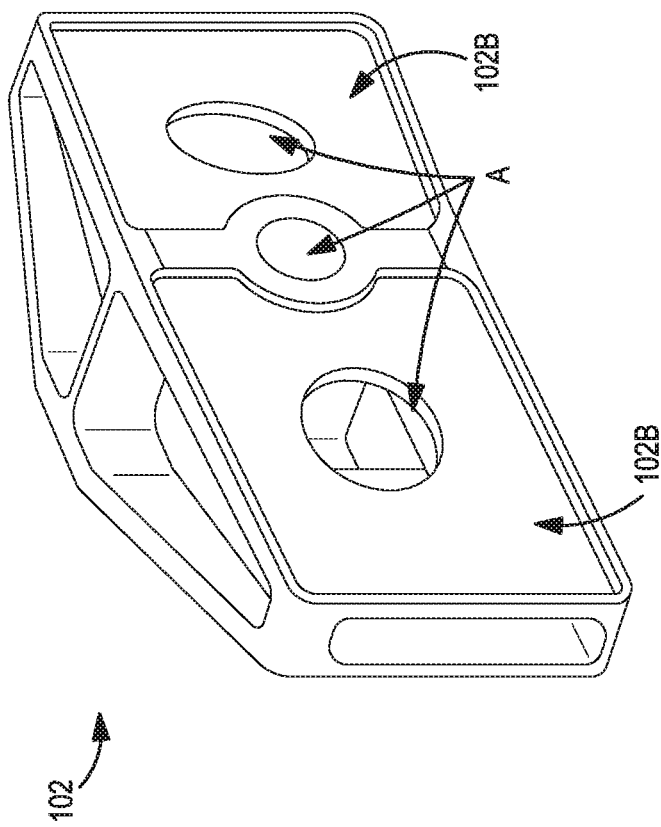

FIGS. 3B-3D are various views of housing, generally designated 102. Housing 102 is configured to receive portions of engine attachment component 200. For example, attachment portions 208 of engine attachment component 200 are configured to extend internally within one of the pockets or openings 102C of housing 102. Stated differently, housing 102 is "pocketed" (see, e.g., pocket 102C in FIG. 3D) inside to allow engine attachment component 200 (e.g., in a form of a "T-bracket") to extend up inside of housing 102. Housing 102 is configured to surround attachment portions 208 (e.g., between attachment portions 208 and interior of housing 102) as well as into and through connecting members 110 that connect attachment regions and housing 102. Isolator device 100 is configured to dissipate heat by virtue of metal-to-metal connections between attachment portions 208 of engine attachment component 200 and metallic connectors (e.g., 110) extending therethrough.

FIGS. 3C-3D illustrate various exemplary aspects associated with housing 102. Housing 102 shown in FIGS. 3C and 3D is a thin-walled stainless steel component. In some embodiments, housing 102 comprises metal (e.g., steel, stainless steel, nickel, metal alloys, or the like) and thin walls for reducing weight. In addition, in some embodiments, housing 102 is configured to increase the thermal conduction path between opposing elastomeric elements 108 and engine attachment component 200 by spacing these elements such a distance apart so that thermal energy can be reduced before encountering elastomeric elements 108. That is, isolator device 100 is designed so that it is possible to dissipate about 100° F. (about 38° C.) or more, about 200° F. (about 93° C.) or more, or more than about 400° F. (about 204° C.) of heat from engine casing and engine attachment component 200 prior to the heat being transferred to elastomeric elements 108, so that this heat does not significantly damage elastomeric elements 108 during normal operation. Housing has interfacing surfaces (e.g., first and second surfaces 102A and 102B) for elastomeric elements 108 (see, e.g., FIG. 2), as is illustrated in FIGS. 3C and 3D. Housing 102 attaches to an airframe via a connecting member 114 (see, e.g., FIG. 1) extending through an airframe connection portion, generally designated 102D, of housing 102. Airframe connection portion 102D is the attachment location on isolator device 100 for airframe connection.

Figure 4:
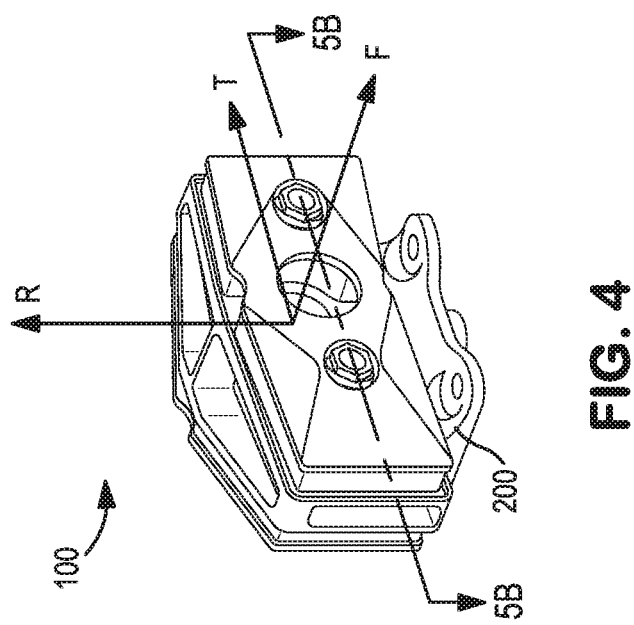
FIG. 4 is a schematic diagram illustrating the controlled-stiffness directions within an isolator device according to an embodiment of the presently disclosed subject matter.

FIG. 4 is a schematic diagram of forces reacted from an aircraft engine. Isolator device 100 includes elastomeric elements 108 provided in compression in shear for reacting radial (R), tangential (torque; T), and forward (F) loads for inhibiting the loads from being transmitted into an airframe, airframe component, support component, or avionics structure attached thereto.

The controlled stiffness directions (e.g., R, T, and F) desired are shown in FIG. 4. In some installation types, the engine's center of gravity is located forward of the isolators, for example, by about 10-15 inches. As a result, lateral and vertical maneuver forces and prop gyroscopic loads result in a pitch or yaw tendency for the engine. The fore/aft stiffness direction F of isolator device 100 provides the majority of the deflection control for the engine. Therefore, the isolator devices 100 are designed with a stiffness ratio of about 6:1 in fore/aft direction F. The comparatively softer flexibility in the radial direction R is used to provide significant vibration attenuation of the engine N1, N2 shaft vibration frequencies.

Isolator device 100 includes flat elastomeric elements 108 oriented in a chevron configuration in a lateral/vertical plane. Elastomeric elements 108 are configured as high-capacity compression elements, which are very stiff in compression directions, and very soft in shear directions. In this configuration, fore/aft thrust loads are reacted through compression of elastomeric elements 108, while vertical and lateral loads are reacted through shear.

Torque reaction is provided by the chevron-configuration of elastomeric elements 108. Tilting the elastomer at the chevron (V-shaped) angle (e.g., by about 12 degrees) provides a vectored compression load in elastomeric elements 108 in the tangential or torque direction T. This configuration allows isolator device 100 to achieve higher stiffness in the tangential direction to limit deflection under torque loads. With significantly more elastomer stress-area available in the chevron packages, isolator device 100 has an improved capability of reacting such higher torque loads.

Figure 5B:
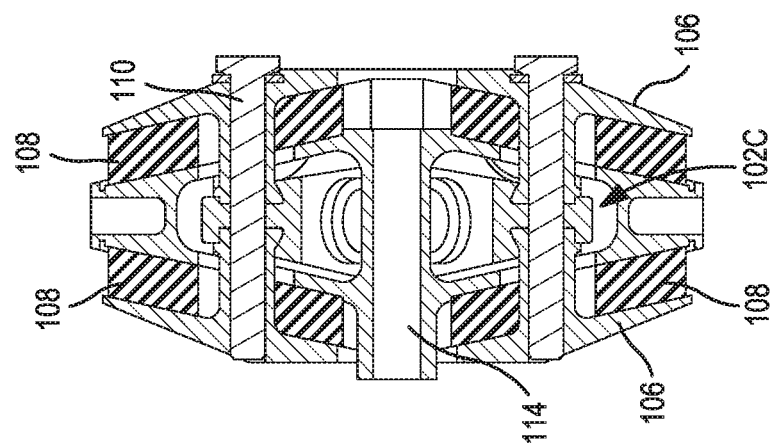
FIGS. 5A-5B are various views illustrating an isolator device and/or system according to an embodiment of the presently disclosed subject matter.
Figure 5A:
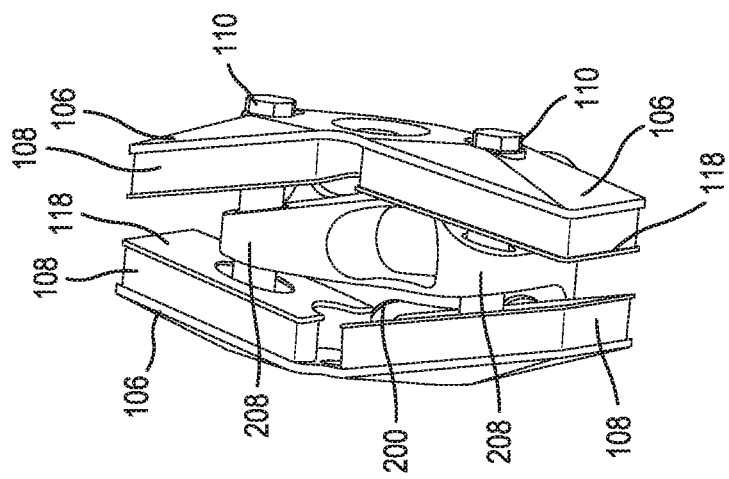

FIGS. 5A-5B are illustrate an isolator device 100 according to an embodiment of the presently disclosed subject matter. For clarity reasons only, housing 102 has been hidden in FIG. 5A. FIG. 5B is a cross-sectional view taken along the sectional line 5B-5B, as shown in FIG. 4. As FIGS. 5A-5B illustrate, engine attachment component 200 connects (e.g., metal to metal) with connecting members 110 for dissipating heat. Air pockets or openings 102C are disposed about portions of connecting members 110. Connecting members 110 and housing 102 increase the length of the thermal conduction path within isolator device 100 for improving thermal management and promote self-cooling within portions of isolator device 100. Elastomeric elements 108 are angled and spaced apart from each other across a housing 102 via connecting members 110. The extra space and air pockets provided via housing 102 allow isolator device 100 to operate at higher temperatures without elastomeric elements 108 therein being significantly damaged during normal operation.

As shown in FIG. 5B, elastomeric elements 108 are designed to interface directly against the outside surfaces (e.g., first and second surfaces 102A, 102B) of housing 102 as opposed to engine attachment component 200. Since housing 102 is connected to the airframe (e.g., via connecting member 114), the temperature of housing 102 is much cooler than that of engine attachment component 200. Meanwhile, the connection between load reacting structures 104 and engine attachment component 200 is made through the outer plates (e.g., plates 118) of elastomeric elements 108.

The design of isolator device 100 and configuration of components comprising isolator provides at least two benefits of note in terms of thermal management for isolator device 100. First, the increased distance between the engine (not shown) and plates 106, 118 provides significant restriction (e.g., increased thermal resistance) against conduction of thermal energy (e.g., heat). Second, interfacing engine attachment component 200 with plates 106, 118 provides a heat-sink cooling effect before the thermal energy is conducted so far inside of isolator device 100 as to reach elastomeric elements 108. The highly convective environment around isolator device 100 (e.g., within the inlet plenum-bay) is able to extract (e.g., via convective and/or radiative cooling) this heat conducted from engine attachment component 200 and plates 106, 118, to maintain the temperature of elastomeric elements 108 at values significantly within the temperature limits of the material from which elastomeric elements 108 are formed. This design may also provide the capability for the airframe to use a dedicated plenum as opposed to a dump-plenum due to the thermal protection provided against conduction energy.

Isolator device 100 includes plates 106 and 118 having cylindrical internal protrusions (e.g., spacer bushings 116), which extend through housing 102 and interface with and/or against engine attachment component 200. The connecting members 110 (e.g., precompression bolts) are used to assemble isolator device 100 together and provide the connection between plates 106 and 118 and engine attachment component 200. As illustrated in FIG. 5B, plate 106 on the left side of isolator device 100 is internally threaded, such that connecting members 110 are configured to threadably engage with left plate 106 to apply a precompression force. In some other embodiments, the right plate 106 is internally threaded and connecting members 110 are inserted from the left through left plate 106, opposite the assembled configuration of isolator device 100 illustrated in FIG. 5B.

Figure 6A:
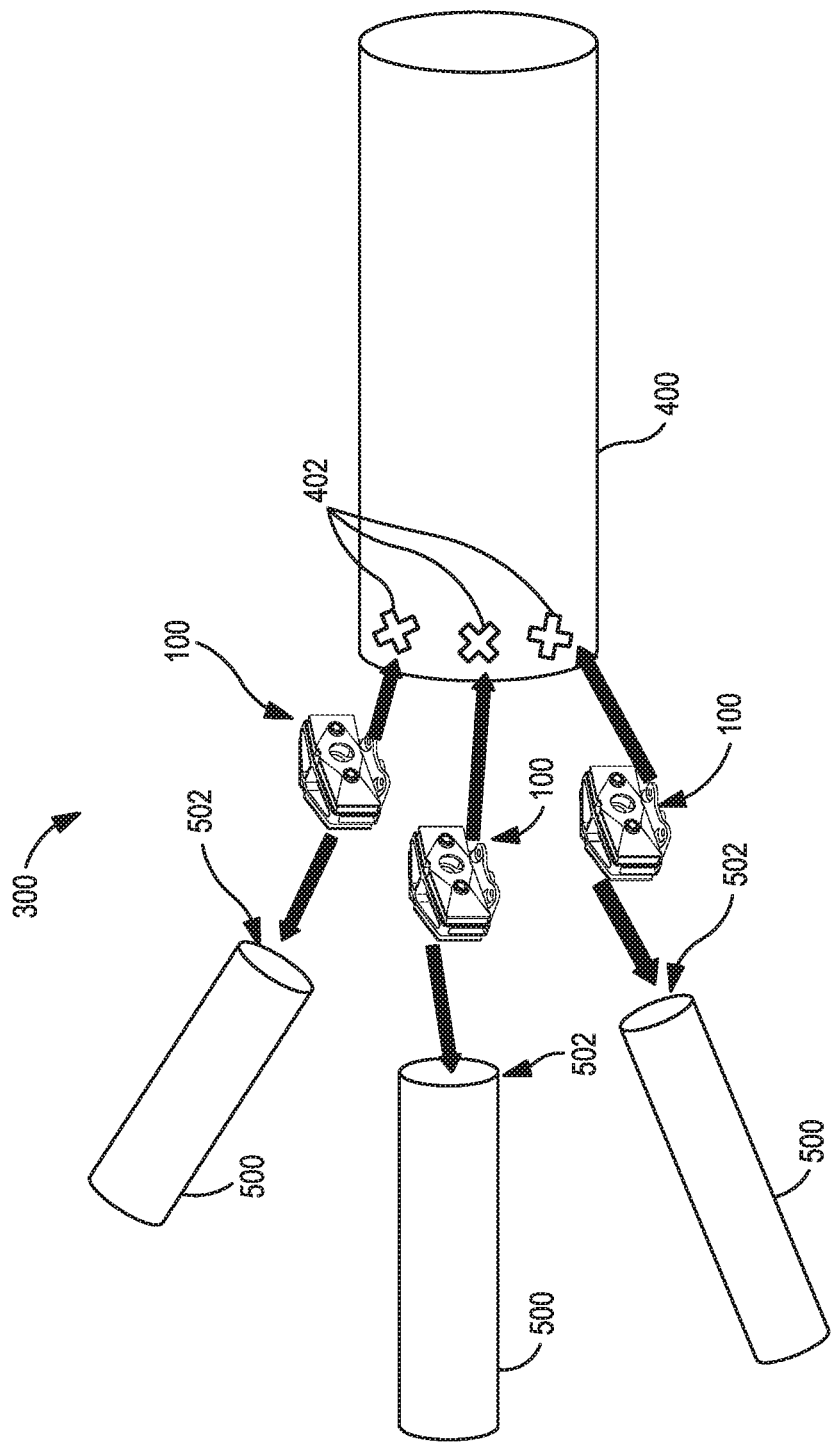

FIG. 6A is a schematic diagram of an isolator system, generally designated 300, according to an embodiment of the presently disclosed subject matter. Isolator system 300 includes an engine 400 and a plurality of support members 500. Support members 500 may include, for example, an airframe, or portions thereof, struts, trusses, frame members, support members, beams, bars, rods, or the like. Support members 500 may be attached to an aircraft body (not shown), or portions thereof, for example, an aircraft housing, fuselage, nacelle, or other aircraft member, structure, component, equipment, or system. A plurality of isolator devices, generally designated 100, are provided in system 300, being connected respectively between engine 400 and a support member 500.

In some embodiments, a plurality of first attachment surfaces 402 are disposed on or over an engine interface 404 of engine 400. Engine interface 404 refers to an external or outermost surface of engine 400, which may include an outer surface of an engine frame or engine case and/or an attachment pad disposed on an outer surface of an engine frame or engine case.

In some embodiments, each first attachment surface 402 includes planar surfaces disposed in an engine frame, case, or the like. In some embodiments, one isolator device 100 is configured to attach to each first attachment surface 402 disposed on or over engine 400. Although three isolator devices 100 are shown, more than three isolators (e.g., a quantity of four, five, six, etc.) may be provided about portions of engine 400, or less than three isolators (e.g., a quantity of one or two) may be provided. First attachment surfaces 402 may include recessed surfaces configured to receive a projection, projection "key", or shear boss 204 (FIG. 1D) portion of engine attachment component 200. In some embodiments, an optional heat shield or thermally heat sinking material is disposed between portions of isolator device 100 and engine 400, such as between shear boss 204 and engine 400.

Each of the plurality of isolator devices 100 in system 300 is configured to attach to a respective support member 500. Second attachment surfaces 502 are disposed in each support member. In some embodiments, first and second attachment surfaces 402 and 502, respectively, are orthogonally disposed with respect to each other for attaching to orthogonal portions of isolator device 100 (e.g., connecting member 114 and plate 201). Thus, system 300 includes an engine 400, a plurality of support members 500 configured to support engine 400, and a plurality of isolator devices 100 disposed between engine 400 and a respective support member 500 for isolating support members from vibrations and loads emanating from and/or generated by engine 400.

An isolation system 300 using such elastomeric materials according to any of the embodiments described above, as it is devoid of fluid, results in a significant reduction of noise and vibration into the airframe, introduces damping, thereby lowering amplification factors of higher order structural modes, provides necessary damping to mitigate risk of whirl-flutter on turboprop applications, and provides a more balanced load distribution throughout the system (provided by controlled stiffness). Isolation system 300 further results in a significant reduction of loads due to tolerance stack-up and installation misalignment, eases adjusting stiffness at flight-test stage to optimize tuning because analytical methods may have inaccuracies, provide a quicker engine installation into the aircraft due to compliance at interface attachments, and includes the ability for isolators to accommodate diametrical thermal-growth. Isolator devices 100 and system 300 are configured to isolate maneuver loads, propeller torque, malfunction and seizure loads, and to isolate vibration so as to lower the vibration transmitted to the aircraft via support members 500.

FIGS. 6B-6C are schematic illustrations of an isolator system, generally designated 600, according to an embodiment of the presently disclosed subject matter. Isolator system 600 includes an engine, generally designated 700, and an airframe, generally designated 800. Airframe 800 comprises plurality of support members, such as trusses. A plurality of isolator devices 100 (e.g., four isolator devices 100) are disposed between engine 700 and portions of airframe 800.

In some embodiments, each isolator device 100 in system is configured to attach to an attachment surface or engine interface 702 of engine 700. Engine interface 702 includes an external or outermost surface of engine 700, which may include an outer surface of an engine frame or engine case and/or an attachment pad disposed on an outer surface of an engine frame or engine case.

Each of the plurality of isolator devices 100 in system 600 is further configured to attach to one or more support members of airframe 800. For example, in some embodiments, isolator devices 100 attach to one or more surfaces 802 of a collar of airframe 800. System 600 includes an engine 700, an airframe 800 configured to support engine 700, and a plurality of isolator devices 100 disposed between engine 700 and a respective airframe 800 for isolating airframe from vibrations and loads emanating from engine 700.

In some embodiments, each isolator device 100 in isolator systems 300 and 600 includes a common-configuration or design, which can be used interchangeably at all engine-attachment locations. The design of isolator device 100 is advantageous, as it can easily be scaled up or down in size, as needed, to accommodate different engine sizes, shapes, and/or types (e.g., turboprop, etc.).

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. An isolator device comprising:
a housing comprising a first surface and a second surface, wherein the first and second surfaces at least partially define a perimeter of the housing;
an engine attachment component disposed at least partially inside of the housing; and
a plurality of elastomeric elements disposed on or over each of the first and second surfaces of the housing, wherein the plurality of elastomeric elements are spaced apart from the engine attachment component via the housing for improving dissipation of heat from the engine attachment component.

2. The device of claim 1, wherein the plurality of elastomeric elements comprise natural rubber.

3. The device of claim 1, wherein the housing and the engine attachment component comprise metal.

4. The device of claim 1, wherein the engine attachment component comprises a bracket.

5. The device of claim 1, wherein the housing comprises a plurality of pockets or openings disposed about portions of the engine attachment component, so that heat is convectively transferred into ambient air in the plurality of pockets or openings.

6. The device of claim 1, wherein at least two of the plurality of elastomeric elements are angled with respect to each other in a chevron shape for reacting loads via a combination of shear and compression.

7. The device of claim 1, wherein the housing and the engine attachment component are movable with respect to each other.

8. The device of claim 1, comprising a connecting member configured to rigidly connect the housing to an airframe.

9. The device of claim 1, comprising a plurality of connecting members configured to connect the engine attachment component to one or more plates in contact with the plurality of elastomeric elements.

10. An isolator system comprising:
- an engine interface;
- an airframe; and
- a plurality of isolator devices attached to the engine interface and the airframe, wherein each of the plurality of isolator devices comprises:
  - a housing comprising a first surface and a second surface, wherein the first and second surfaces at least partially define a perimeter of the housing, and wherein the housing is configured for attachment to the airframe;
  - an engine attachment component disposed at least partially inside of the housing, wherein the engine attachment component is configured for attachment to the engine interface; and
  - a plurality of elastomeric elements disposed on or over each of the first and second surfaces of the housing, wherein the plurality of elastomeric elements are spaced apart from the engine attachment component via the housing for improving dissipation of heat from the engine attachment component.

11. The system of claim 10, wherein the plurality of elastomeric elements comprise natural rubber.

12. The system of claim 10, wherein the housing and engine attachment component comprise metal.

13. The system of claim 10, wherein the engine attachment component comprises a bracket.

14. The system of claim 13, wherein the housing comprises a plurality of pockets or openings disposed about portions of the engine attachment component, so that heat is convectively transferred into ambient air in the plurality of pockets or openings.

15. The system of claim 10, wherein at least two of the plurality of elastomeric elements are angled with respect to each other in a chevron shape for reacting loads via a combination of shear and compression.

16. The system of claim 10, wherein the housing and engine attachment component are movable with respect to each other.

17. The system of claim 10, comprising a connecting member configured to rigidly connect the housing to the airframe.

18. The system of claim 10, comprising a plurality of connecting members configured to connect the engine attachment component to one or more plates in contact with the plurality of elastomeric elements.

19. The system of claim 10, wherein the plurality of isolator devices are four isolator devices incrementally disposed about the engine interface.

20. A method of isolating a structural component within an aircraft, the method comprising:
- providing an engine interface;
- providing an airframe;
- providing a plurality of isolator devices between the engine interface and the airframe, wherein each of the plurality of isolator devices comprises:
  - a housing comprising a first surface and a second surface, wherein the first and second surfaces at least partially define a perimeter of the housing, and wherein the housing is configured for attachment to the airframe;
  - an engine attachment component disposed at least partially inside of the housing, wherein the engine attachment component is configured for attachment to the engine interface; and
  - a plurality of elastomeric elements disposed on or over each of the first and second surfaces of the housing, wherein the plurality of elastomeric elements are spaced apart from the engine attachment component via the housing for improving dissipation of heat from the engine attachment component;
- attaching the engine attachment component of each of the plurality of isolator devices to the engine interface; and
- attaching the housing of each of the plurality of isolator devices to the airframe via at least one connecting member.

21. The method of claim 20, wherein the plurality of elastomeric elements of each of the plurality of isolator devices comprise natural rubber.

22. The method of claim 20, wherein the housing and the engine attachment component of each of the plurality of isolator devices comprise metal.

23. The method of claim 20, wherein at least two of the plurality of elastomeric elements of each of the plurality of isolator devices having elastomeric elements that are angled with respect to each other in a chevron shape for reacting loads via a combination of shear and compression.

* * * * *